United States Patent [19]

Eckhardt

[11] Patent Number: 4,484,479

[45] Date of Patent: Nov. 27, 1984

[54] GAS FLOW METERING

[76] Inventor: Richard Eckhardt, c/o ECD Corp., 196 Broadway, Cambridge, Mass. 02139

[21] Appl. No.: 893,679

[22] Filed: Apr. 5, 1978

[51] Int. Cl.³ .......................... G01L 9/12; G01F 1/38
[52] U.S. Cl. ........................... 73/861.47; 73/730; 361/285
[58] Field of Search ............... 73/205 R, 211, 715, 73/730, 724, 213, 861.63, 861.61, 861.71, 861.47, 861.53; 361/285, 283

[56] References Cited

U.S. PATENT DOCUMENTS

| | | | |
|---|---|---|---|
| 1,939,067 | 12/1933 | Legg | 73/724 |
| 2,127,501 | 8/1938 | Dall | 73/861.61 X |
| 2,522,574 | 9/1950 | Hagenbuch | 361/285 |
| 2,538,785 | 1/1951 | Karig | 73/861.71 X |
| 2,915,078 | 12/1959 | Ochs, Jr. | 73/861.63 X |
| 2,976,720 | 3/1961 | Callahan | 324/61 R X |
| 2,987,915 | 6/1961 | Hildenbrandt, Jr. | 73/861.61 X |
| 3,130,586 | 4/1964 | Taylor et al. | 73/730 |
| 3,148,314 | 9/1964 | Ponemon | 361/285 |
| 3,163,529 | 12/1964 | Jewett | 73/730 |
| 3,240,207 | 3/1966 | Barker et al. | 73/730 |
| 3,352,157 | 11/1967 | Seegmiller | 73/724 |
| 3,385,112 | 5/1968 | Pruitt et al. | 73/756 |
| 3,563,095 | 2/1971 | Robinson, Jr. | 73/730 |
| 3,618,390 | 11/1971 | Frick | 73/718 |
| 3,724,503 | 4/1973 | Cooke | 73/861.63 X |
| 3,802,265 | 4/1974 | Wood | 73/861.47 |
| 4,012,939 | 3/1977 | Hayward | 73/861.47 |
| 4,091,683 | 5/1978 | Delatorre | 73/718 |

FOREIGN PATENT DOCUMENTS 2747949  2/1976  Fed. Rep. of Germany ........ 73/730

Primary Examiner—Daniel M. Yasich
Attorney, Agent, or Firm—Jerry Cohen

[57] ABSTRACT

Gas flow metering using a capacitance measurement and comprising a taut elastomeric membrane, preferably tubular in form, which expands or contracts as a function of flow rate past it to an extent determined by Bernouilli's principle. The thus changing distance between this membrane and one or more external electrodes measured by capacitance change or other means is correlatable with the instantaneous flow rate and such measurement can be made essentially without regard to entrained solids or liquids in the gas flow, phase and temperature changes (moderate) within the gas flow or mixture or changing composition therein and with rapid response and low back pressure.

7 Claims, 4 Drawing Figures

GAS FLOW METERING

BACKGROUND OF THE INVENTION

The present invention relates to gas flow metering and is characterized by providing a simple economic gas flow meter which measures the flow rate with high sensitivity, rapid response and low back pressure, without penetrating the flow cross section and which is compact, the achievement of the foregoing being objects of the invention.

SUMMARY OF THE INVENTION

A pretensioned membrane, preferably in tubular form, is provided in relation to the flow to be measured so that changes in flow rate, either expand the membrane away from the flow axis or contract the membrane towards it (the membrane lying essentially parallel to such axis). The membrane is preferably tubular in form. This change of the membrane in relation to the flow axis is determined solely by Bernouilli's principle—engendered forces acting on the pretensioned membrane. The membrane deflection can be measured by several means, capacitive measurement being preferred. One or more capacitor electrodes may be placed in relation to the membrane, either inside the flow cross section or outside, preferably the latter, so that a conductive coating on the electrode acts in relation to the fixed electrode(s) to define a capacitance gap (or gaps) the length of which produces a capacitance measurement which changes in relation to flow rate as the membrane expands or contracts as stated above. Capacitance changes as the square root of the flow rate. For best sensitivity, it is desirable to vent the flow conduit to the back side of the membrane (the front side being towards the measured flow) and apply the back pressure of the device to the back side of the membrane. The vent could also be to the outside or the chamber could be sealed; both of these alternatives would reduce sensitivity and make the device sensitive to static pressure.

The device can be operated with low vulnerability to entrained solids and liquids in the gas flow, gas composition variation, acceleration of gravitational forces, and without disturbing the flow cross section. Rapid response and high accuracy measurement are feasibly made and back pressure of the measured flow is undisturbed.

Other objects, features and advantages of the invention will be apparent from the following detailed description thereof taken in connection with the accompanying drawing, in which,

DETAILED DESCRIPTION OF PREFERRED EMBODIMENTS

Figure 1:
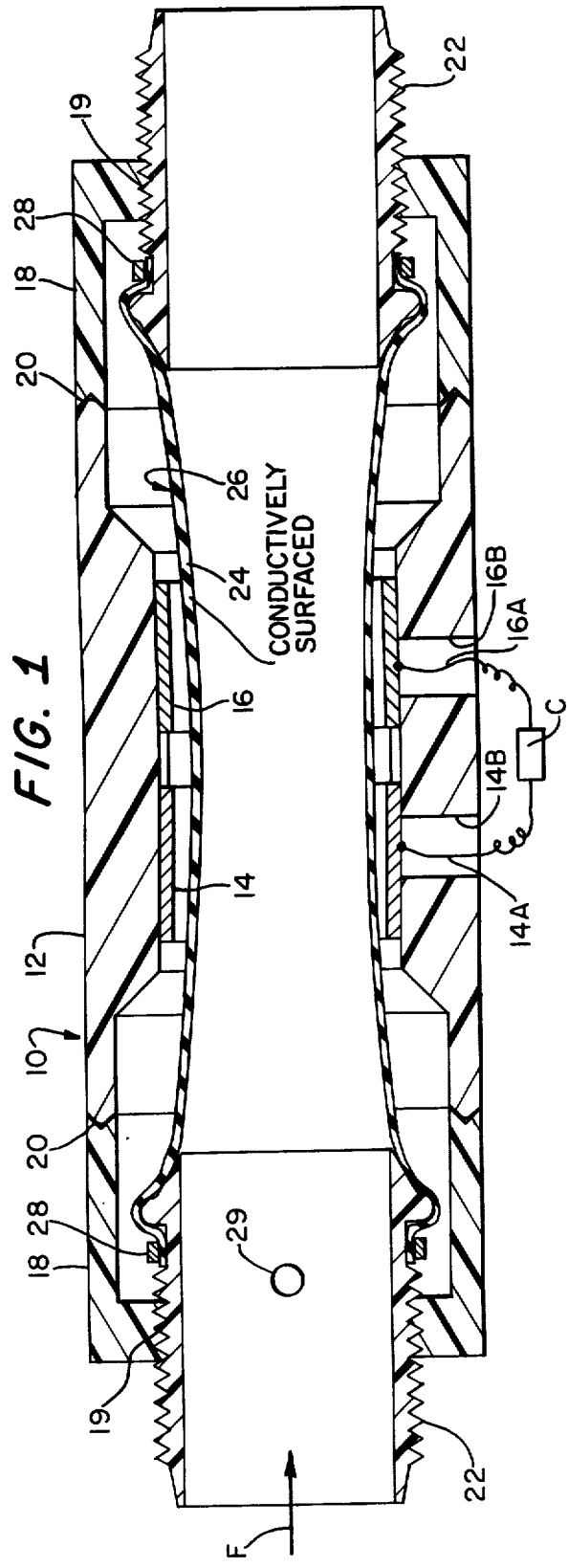
FIGS. 1 and 2 are cross section sketches of preferred embodiments thereof.

Referring now to FIG. 1 of the drawing, there is shown a flow meter instrument 10 comprising a central cylindrical casing member 12 which is either made of a rigid plastic or a metal with plastic surfaces via connectors 14A and 16A, respectively, in hole 14B and 16B in body 12 to capacitance measuring circuit C. Circuit C may be a capacitance bridge or other measuring circuit. The capacitance can also be measured by placing the transducer (e.g., the above described capacitor or other transducer) in an oscillator and measuring the resultant frequency changes with respect to flow rate. This could be done with a phase locked loop or other instruments for measuring frequency.

Two tubular end pieces 18 engage cylindrical member 12 at rotatably sliding interfaces 20 (until glued or otherwise bonded together with member 12) and have inner threaded openings 19. Passing through such openings are externally threaded end nipples 22 for attachment to flow conduits. A membrane 24 with an external electrically conductive metal coating 26 is secured to said end nipples by cable ties 28. A vent hole 29 passes through the upstream end nipple 22 (gas flow to be measured moving as indicated by arrow F) to tap off a small amount of the gas flow (insignificant for purposes of measurement) to equalize static pressure across membrane 24. The flow rate variation will, in accordance with Bernouilli's principle, cause expansion or contraction of tubular membrane 24 in turn changing its spacing relative to transducer means such as capacitor electrodes 14 and 16. In lieu of this arrangement, one of such capacitor electrodes could be used and an electrical connection could be made directly to coating 26 with increased sensitivity and precision. If desired, the outside of the plastic housing members can be metallized to shield out electrical and magnetic interference sources. The engaging threads of members 18 and 22 is used to space members 22 to establish a desired tension on tube 24 which is selected and arranged such that in the absence of such tension it would be touching members 14 and 16 but is spaced therefrom and internally thereof under the tension. The degree of initial spacing will depend on calibration for different tests. Typically, the radius of tube 24 is $\frac{1}{2}$ centimeter. With these exemplary dimensions, flow throughput of 3–300 liters/minute (i.e., velocity from 64–6400 cm/sec at assumed air density of 0.0013 gm/cm$^3$ yielding 2.61–261 dyne/cm$^2$ lower-upper limits of dynamic pressure) would have Reynold's numbers of 217–21,700 from lower to upper limits of these assumed flow conditions. The back pressures, applying laminar flow and turbulent flow calculations, are respectively 3.86–7100 dyne/cm$^2$ at lower and upper limits at the assumed upper and lower conditions of flow measurement respectively, producing forces on a cylindrical membrane of 20.53–2,053 dynes. These are manageable conditions for materials for the membrane readily available within the skill of the art. It is also noteworthy that these compare with less than 2 dynes gravitational force (per g) and effects of an entrained liquid drop of say, 0.0025 grams (producing a force of 24.5 dynes (245 at 10 g)).

The membrane may be made of known natural synthetic rubber or other elastomeric or plastic material which are capable of being stretched, but are resilient in the stretch condition to deflect in response to changing forces as described above applied thereto.

Figure 2:
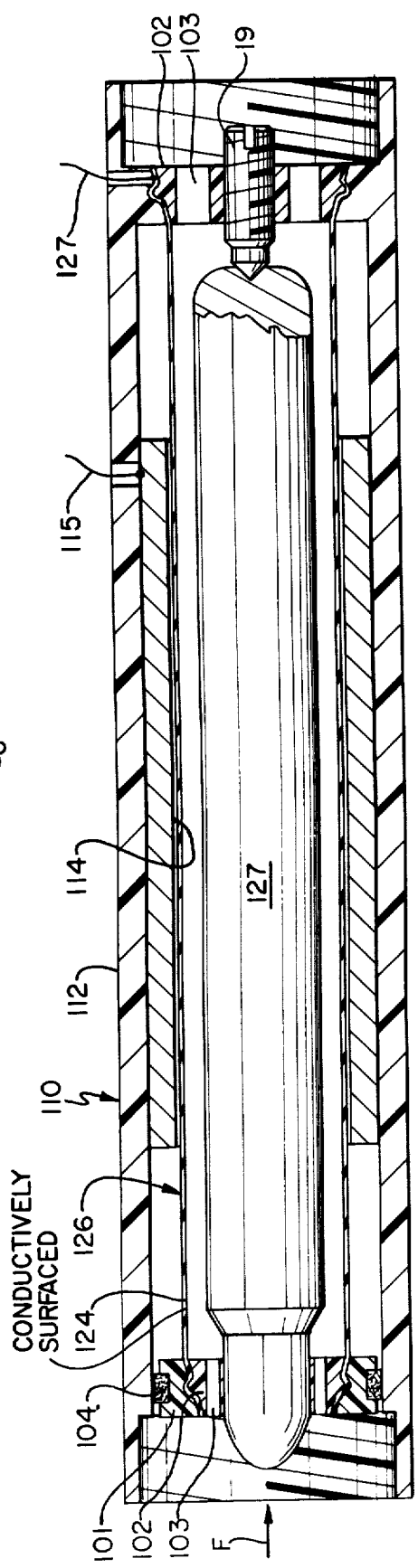

FIG. 2 shows another embodiment of the invention comprising an instrument 110 which has a cylindrical body 112 containing a ring electrode 114 and a taut cylindrical membrane 124 with a conductive coating 126 with electrical connectors 115 and 127. A core (mandrel) 127 is provided to limit flow area because the larger the diameter of the membrane, the greater the deflection for a given pressure differential. The larger diameter, however, causes a lower gas velocity for a given flow rate, and therefore a lower Bernouilli effect, and a lower differential pressure. The mandrel in the center allows one to keep both the large diameter and the high flow velocity. It also allows for easier assembly and a more easily manipulated tension adjustment. End pieces 102 serve the membrane and have holes 103 for gas flow. A screw adjustment 19 provides tension control. A gasket 104 made of yarn, felt or other porous material surrounds collar 101 which together with plate 102 compressively holds membrane 124 allows air flow (but not liquid flow) from the inlet into the space between 114 and 124 for the same purposes as hole(s) 29 in FIG. 1 and allows tension controlling movement of the mandrel.

Figure 3:
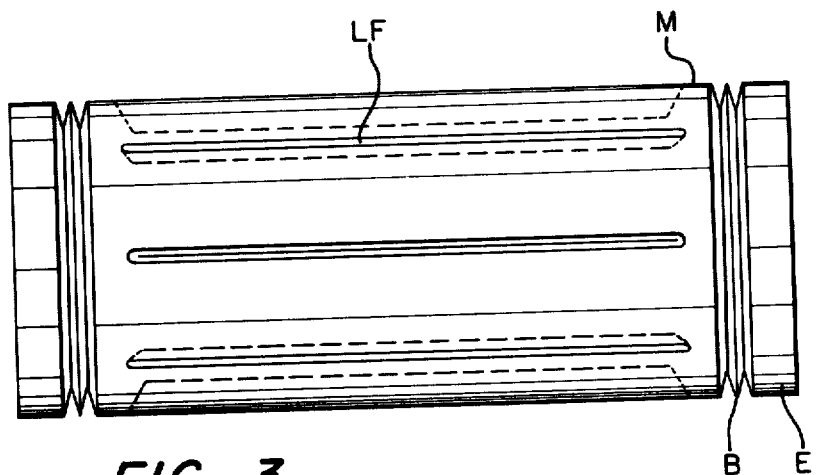
FIGS. 3 and 4 are side and end views respectfully of a membrane construction preferably used in the embodiments of FIGS. 1 and 2.
Figure 4:
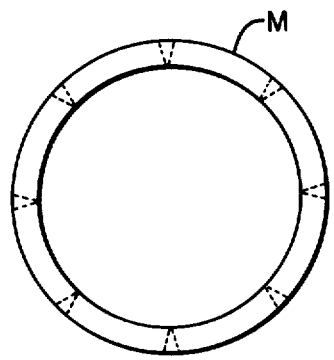

FIGS. 3–4 shows a metal tubular membrane M which may be used in the FIGS. 1–2 embodiments, comprising plural longitudinal folds LF running substantially the full length thereof to allow membrane diameter change without substantial stretching of the material. Bellows B expansion linkages are provided adjacent the tie-down ends E of the tubular membrane to relieve lengthwise tension as the membrane expands and contracts.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Flow metering instrument comprising a casing, a a tubular flow through passage in said casing, a membrane stretched taut in said flow passage and arranged to deflect in accordance with flow back pressure changes to an extent in accordance with Bernouilli's principle, means on the interior of said casing providing a signal directly responsive to the deflection of the membrane by measuring capacitance change, means defining a conductive surface on said stretched membrane, said signal providing means comprising means defining a capacitive gap between said means on the interior of said casing and the said conductive surface, whereby the said deflection of the membrane will vary the size of the capacitive gap and thereby vary an electrical signal obtainable through use of said gap.

2. Flow metering instrument comprising a casing, a flow through passage in said casing, a tubular membrane stretched taut therein and arranged to deflect inwardly to an extent in accordance with flow back pressure changes within the tube in accordance with Bernouilli's principle, means mounted on the interior of said casing, means for establishing a capacitive gap between said means on the interior said casing and a portion of said tubular membrane therein, said portion of the tubular membrane being electrically conductive, whereby the said deflection of the membrane will vary the size of the capacitive gap and thereby vary an electrical signal obtainable through use of said gap.

3. Flow metering instrument in accordance with claim 2 wherein a central core is provided within the tubular membrane defining a flow passage therebetween.

4. Flow metering instrument in accordance with claim 1, wherein two fixed electrodes are provided in opposing relation to said conductive membrane surface.

5. Flow metering instrument in accordance with claim 4 wherein the membrane is pretensioned so that in the absence of flow induced back pressure drop the membrane would touch said electrodes and is deflected to be spaced therefrom by such drop.

6. Flow metering instrument in accordance with any of claims 1 and 3 wherein the membrane comprises longitudinal folds to establish its expansion and contraction capability.

7. Flow metering instrument in accordance with claim 6 wherein the membrane has transverse (to membrane tensioning direction) end folds to relieve lengthwise tension as the membrane expands and contracts.

* * * * *